W. E. RIECKEN.
SHAPING MACHINE.
APPLICATION FILED NOV. 1, 1916.

1,251,578.

Patented Jan. 1, 1918

Inventor:
William E. Riecken.
by [signature], Att'y.

UNITED STATES PATENT OFFICE.

WILLIAM E. RIECKEN, OF NEW YORK, N. Y., ASSIGNOR TO WESTERN ELECTRIC COMPANY, INCORPORATED, OF NEW YORK, N. Y., A CORPORATION OF NEW YORK.

SHAPING-MACHINE.

1,251,578.  Specification of Letters Patent.  Patented Jan. 1, 1918.

Application filed November 1, 1916. Serial No. 128,873.

*To all whom it may concern:*

Be it known that I, WILLIAM E. RIECKEN, a citizen of the United States, residing at New York, in the county of New York and State of New York, have invented certain new and useful Improvements in Shaping-Machines, of which the following is a full, clear, concise, and exact description.

This invention relates to the shaping of parts of solid conducting material, and more especially to the shaping thereof while heated to facilitate working.

Heretofore, in the shaping of parts of solid conducting material, and more especially metallic parts of but little malleability, as for example, parts made from silicon steel, considerable breakage was experienced when the parts were shaped cold. To overcome this, it was proposed to heat the parts in furnaces, or the like, and then take them to shaping machines. This arrangement was also found unsatisfactory, as the parts would cool considerably before they could be operated upon by the machines. A number of heatings were also necessary before shaping could be completed, and even in such cases breakage was common, as the parts would often have cooled to such an extent as to break while being operated upon.

The principal objects of this invention are to overcome the above difficulties, to successfully shape solid conducting parts without breakage, and to reduce the cost of shaping such parts. A second object is to effect discontinuance of the heating of the part being operated upon automatically through the performance of the shaping operation upon the part being treated. Another object is to provide an attachment which can be used with electric welding machines of usual construction. One feature of the invention to accomplish these objects, is the provision of a machine to heat such parts and also to shape them in the machine while in their heated condition.

Figure 1:
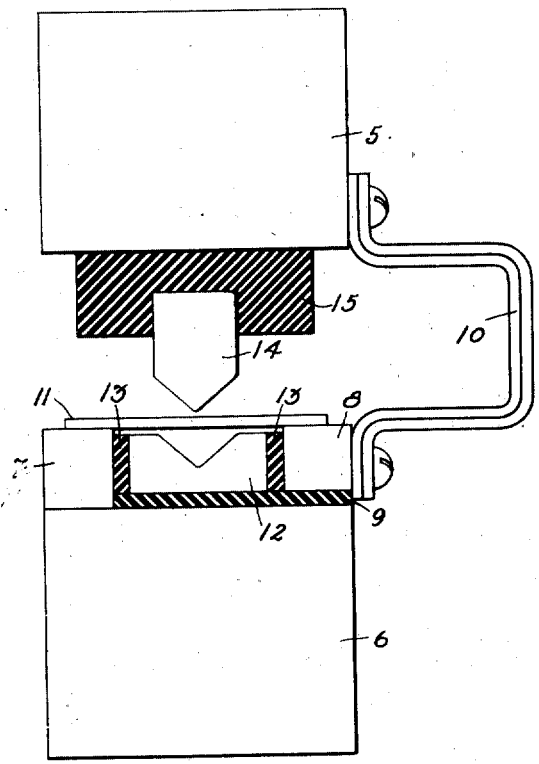
Figure 2:
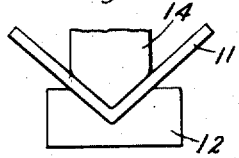

Referring to the drawings illustrating one embodiment of the invention, Figure 1 is a side elevation partly in section of an attachment applicable to electric welding machines, while Fig. 2 is a detailed view of the die and former used, showing a part as shaped thereby.

The construction shown is particularly applicable to electric welding machines having upper and lower members relatively movable to and from one another, and arranged to carry the particular electrodes it may be desired to use for the work in hand. A conducting block 5 of the attachment is designed to be held by the upper member in the place designated for the upper electrode of the welding machine, while a lower conducting block 6 is designed to be held by the lower member in the place designated for the lower electrode of the welding machine. Supporting electrodes 7 and 8 are provided and mounted upon the lower block 6. The electrode 7 is shown mounted directly on the block 6 in conductive relation thereto, while the electrode 8 is separated from the block 5 by insulation 9. In welding machines of the type with which the arrangement illustrated is designed for use, the electric current is brought to the upper and lower electrode holders which are used to hold the blocks 5 and 6 respectively. In this situation a conductor 10 of flexible material extends from the upper block 5 to the electrode 8 to carry current thereto. If desired, the heating current could be conveyed directly to the electrodes 7 and 8 by suitable conductors, in which case the conductor 10 would be omitted and the electrode 7 preferably insulated from the block 6.

A solid conducting part 11 is shown resting between the electrodes 7 and 8, and serves as a path between them for the heating current. The electrodes 7 and 8 are relatively large compared to the piece 11 to be shaped, and are good heat conductors so as to conduct away the heat generated in the portions of part 11 in contact with the electrodes. This permits of the part 11 being heated to a greater extent in the portion centrally between the electrodes, and the electrodes and part 11 may be so arranged that the part will be heated more at the portion thereof where shaping is to occur. With this end in view, the electrodes 7 and 8 could be given special shapes to correspond with the particular part to be operated upon. For shaping a flat bar, as shown, the electrodes 7 and 8 would be straight bars of rectangular cross-section between which the part 11 would extend.

The arrangement just described effects the heating of the part 11 when a heating current is passed therethrough. To shape the part 11, a suitable die 12 is located between the electrodes 7 and 8 and insulated therefrom by insulation 13, while the insulation 9 separates the die from the block 6. In event of the electrode 7 being insulated from the block 6, the die 12 could rest directly thereon or form an integral part therewith. A former 14 is carried by the upper block 5 and insulated therefrom by insulation 15 if the block 5 is used for the conduction of the heating current. After the part 11 has been sufficiently heated, the block 5 is moved toward the lower block by any suitable means (not shown), and the former 14 forces the part 11 against the die 12 and bends the part 11 to conform thereto. As shown in the drawing, a right-angled bend is given to the part 11, and this die and former arrangement is used in bending core pieces of silicon steel for receiver cores.

While a die 12 and former 14 are illustrated, obviously a similar arrangement could be used for punch and die work, a punch taking the place of the former 14 and a suitable die to coöperate therewith being used in place of the die 12. In this event, a suitable outlet would be provided for the portions punched out from the parts operated upon. The die and former may be formed entirely of, or faced with, any suitable insulating material if desired.

In use either for punch or press work the parts 11 would be heated by the passage of the heat current therethrough and operated upon directly as soon as sufficiently heated, and such operation might take place even while the heated current was passing therethrough.

With the construction illustrated, it is also possible to open the heating circuit through the part 11 by the act of shaping the same. As shown in Fig. 1, the ends of the part 11 are not held against upward movement during bending. When the part has been heated sufficiently, the central portion of the part 11 between the electrodes 7 and 8 is operated upon by the former 14 in coöperation with the die 12, the former 14 and die 12 being so shaped as to give a right-angled bend to the part being operated upon. The ends of the part 11 are raised out of contact with the electrodes 7 and 8 in this operation and thus serve to automatically break the heating circuit.

What is claimed is:

1. An attachment for metal shaping machines having a pair of relatively movable electrode-holders, comprising a block for engagement with one of said electrode-holders, an electrode carried by said block, a second electrode carried by said block and insulated from said first electrode, a second block for engagement with the other of said electrode-holders, and coöperating former elements; certain of said former elements being associated with one of said blocks and other of said former elements being associated with the other of said blocks.

2. An attachment for electric-welding machines having a pair of relatively movable electrode-holders comprising a conducting block for engagement with one of said electrode-holders, an electrode on said block and conductively associated therewith, a second electrode carried by said block and insulated therefrom, a second conducting block for engagement with the other of said electrode-holders and conductively associated with said second electrode, and coöperating former elements, one of said former elements being carried by one of said blocks and another of said former elements carried by the other of said blocks.

3. An attachment for electric-welding machines having a pair of relatively movable electrode-holders comprising a conducting block for engaging one of said electrode-holders, an electrode on said block and conductively associated therewith, a second electrode carried by said block and insulated therefrom, a second conducting block for engagement with the other of said electrode-holders and conductively associated with said second electrode, a die insulated from and carried by said first mentioned block between said electrodes, and a former element coöperating with said die carried by said other block and insulated therefrom.

4. An attachment for electric-welding machines having a pair of relatively movable electrode-holders comprising a conducting block for engagement with one of said electrode-holders, an electrode on said block and conductively associated therewith, a second electrode carried by said block and insulated therefrom, a second conducting block for engagement with the other of said electrode-holders and conductively associated with said second electrode, and coöperating former elements in non-conductive relation to said electrodes, one of said former elements being carried by the first mentioned block and another of said former elements being carried by the other of said blocks.

5. In an apparatus for shaping parts and the like, the combination of means for heating said part, and means whereby the shaping of said part discontinues the operation of said heating means.

6. In an apparatus for shaping parts and the like, the combination of electrical means for heating said part, and means whereby the shaping of said part discontinues the operation of said electrical heating means.

7. In an apparatus for shaping parts and the like, the combination of electrical heating means a circuit therefor, and means whereby the shaping of said part opens the circuit of said heating means.

8. In an apparatus for shaping conducting parts and the like, the combination of electrodes between which the part to be shaped is placed, an electrical heating circuit including said electrodes and the part to be shaped therein, and forming means to shape said part, the operation of said forming means serving to remove said part from at least one of said electrodes to break the heating circuit therethrough.

In witness whereof, I hereunto subscribe my name this 31st day of October, A. D. 1916.

WILLIAM E. RIECKEN